United States Patent [19]
Yamagishi

[11] Patent Number: 5,848,411
[45] Date of Patent: Dec. 8, 1998

[54] METHOD FOR DISTRIBUTEDLY PROCESSING A PLURALITY OF JOBS IN A DATA PROCESSING SYSTEM

[75] Inventor: Tadashi Yamagishi, Yokohama, Japan

[73] Assignee: Hitachi, Ltd., Tokyo, Japan

[21] Appl. No.: 610,978

[22] Filed: Mar. 1, 1996

[30] Foreign Application Priority Data

Mar. 6, 1995 [JP] Japan ................................... 7-045693

[51] Int. Cl.$^6$ ..................................................... G06F 7/00
[52] U.S. Cl. ............................... 707/8; 711/147; 395/675
[58] Field of Search ........................... 395/608, 671–676, 395/677; 707/3, 7, 8, 201; 711/147, 150, 153, 157, 218, 154, 217

[56] References Cited

U.S. PATENT DOCUMENTS

| | | | |
|---|---|---|---|
| 4,153,934 | 5/1979 | Sato | 395/673 |
| 4,658,351 | 4/1987 | Teng | 395/673 |
| 4,918,595 | 4/1990 | Kahn et al. | 395/672 |
| 4,928,234 | 5/1990 | Kitamura et al. | 395/478 |
| 5,321,835 | 6/1994 | Tanaka et al. | 395/671 |
| 5,390,329 | 2/1995 | Gaertner et al. | 395/678 |
| 5,410,694 | 4/1995 | Uchida et al. | 395/601 |
| 5,588,134 | 12/1996 | Oneto et al. | 395/485 |
| 5,619,723 | 4/1997 | Jones et al. | 395/823 |

FOREIGN PATENT DOCUMENTS

A-6-75837  3/1994  Japan .

*Primary Examiner*—Maria N. Von Buhr
*Attorney, Agent, or Firm*—Antonelli, Terry, Stout & Kraus, LLP

[57] ABSTRACT

A method of reading data of the same file by a plurality of jobs in a shared manner which, when one of the jobs issues a read request to read data sequentially stored in the file beginning at a first position thereof, acquires a minimum record number of a record of the file which has not yet been read. The contents of the record having the minimum record number are passed to the job which issued the read request. With this configuration, data of one file can be processed by a plurality of jobs in a shared fashion and the processing load is shared by the jobs.

5 Claims, 6 Drawing Sheets

| JOB NAME | CPU USAGE RATIO | I/O USAGE RATIO | MEMORY USAGE RATIO |
|---|---|---|---|
| ABC001 | 20 | 30 | 20 |
| ABC002 | 20 | 20 | 50 |
| ABC003 | 5 | 40 | 40 |
| ZZZ001 | 8 | 90 | 10 |
| ZZZ002 | 1 | 10 | 5 |
|  |  |  |  |

| FILE NAME | SHARING RULE | NO. OF JOBS | JOB NAME | JOB INPUT RECORD NO. | DATA INPUT REQUEST FLAG |
|---|---|---|---|---|---|
| A.B.C. | SEQUENTIAL | 3 | ABC001 | 49 | ABSENCE |
|  |  |  | ABC002 | 50 | PRESENCE |
|  |  |  | ABC003 | 51 | ABSENCE |
| X.Y | REQUEST | 2 | XYZ001 | 90 | ABSENCE |
|  |  |  | XYZ002 | 100 | ABSENCE |
| ZZ.X | OPERATION STATE | 2 | ZZZ001 | 2 | PRESENCE |
|  |  |  | ZZZ002 | 10 | ABSENCE |
|  |  |  |  |  |  |

//ABC001 JOB
//STEP1 EXEC PGM=SORT
//SORTIN DD DSN=A.B.C, PREST=(3,SEQ)
//SORTOUT DD DSN=OUT1

//ABC002 JOB
//STEP1 EXEC PGM=SORT
//SORTIN DD DSN=A.B.C, PREST=(3,SEQ)
//SORTOUT DD DSN=OUT2

//ABC003 JOB
//STEP1 EXEC PGM=SORT
//SORTIN DD DSN=A.B.C, PREST=(3,SEQ)
//SORTOUT DD DSN=OUT3

METHOD FOR DISTRIBUTEDLY PROCESSING A PLURALITY OF JOBS IN A DATA PROCESSING SYSTEM

BACKGROUND OF THE INVENTION

The present invention relates to a method of executing a plurality of jobs in a data processing system and, in particular, to a method of executing a plurality of jobs in a data processing system in which a plurality of jobs simultaneously process data of an identical file, the data of the file being shared among the jobs.

According to the JP-A-6-75837, there has been described "a memory access method" of increasing the data processing speed. In this method, data is transferred not between files on magnetic disks, but between a plurality of programs related to each other via a file in a semiconductor memory. Thanks to this provision, the number of accesses to the files on the disks is reduced and hence the data processing can be accomplished at a high speed. Moreover, according to the memory file access method above, the same data stored in the semiconductor memory is transferred to the plural programs having a relationship therebetween.

However, it has not been considered in the prior art to use data stored in a file on a disk by a plurality of jobs. Consequently, according to the conventional technology, when data of one file on a disk is desired to be distributively transferred to a plurality of jobs so as to use the data in a shared fashion among the jobs, the data is required to be distributed to a plurality of files respectively associated with the jobs. This disadvantageously results in a problem of difficulty when data stored in one file on a disk is simultaneously or in parallel processed by a plurality of jobs at a high speed.

Additionally, according to the prior art, the processing of data in one file can be executed only by one job beforehand related to the file. Therefore, there has been a problem of difficulty in distributing loads related to the input/output (I/O) operations, central processing units (CPUs), memories, etc.

SUMMARY OF THE INVENTION

It is therefore an object of the present invention to provide a method of executing a plurality of jobs in a data processing system in which the processing of data in one file can be executed by a plurality of jobs in parallel or simultaneously, thereby solving the problem above.

Furthermore, it is another object of the present invention to provide a method of executing a plurality of jobs in a data processing system in which the processing of data in one file can be executed by a plurality of jobs while partitioning processing loads to the plural jobs.

In order to achieve the objects above, there is provided according to an aspect of the present invention a method of reading data of one file by a plurality of jobs in parallel, wherein in response to a read request issued from one of the jobs to read data sequentially stored in the file beginning at a first position of the file, a minimum record number of a record of the file which record has not yet been read is acquired. Contents of the record having the acquired minimum record number are then transferred to the job which has issued the read request. In this fashion, a process of data of one file can be in parallel executed by a plurality of jobs and hence the load of process is partitioned to the plural jobs.

Furthermore, in a method according to another aspect of the present invention of reading data of one file by a plurality of jobs in parallel, sequential numbers are assigned respectively to the plural jobs. The record numbers of last records respectively last read by the jobs from the file are recorded. In response to a read request issued from one of the jobs to read data sequentially stored in the file, judgement is conducted to determine whether or not the record number of the record of the file last read by the job is less than the record numbers of the records of the file last read respectively by the jobs having the sequential numbers less than that of the pertinent job. When the determination is affirmative, there is acquired a minimum record number of a record of the file, the record not having been read therefrom. Contents of the record having the acquired minimum record number are transferred to the job having issued the read request. Also in this method, a plurality of jobs can execute the processing of data in one file in parallel and the processing load is therefore shared thereamong.

Moreover, in a method of a further aspect of the present invention of reading data of one file by a plurality of jobs in a shared fashion, a load of each of the jobs is calculated. In response to a read request issued from one of the jobs to read data sequentially stored in the file, judgement is effected to determine whether or not the load of the job is a minimum load among the loads respectively of the plural jobs. When the determination is affirmative, there is attained a minimum record number of a record of the file, the record not having been read therefrom. Contents of the record having the acquired minimum record number are transferred to the job having issued the read request. In this method, the data processing of one file can be executed by a plurality of jobs in parallel, leading to partitioning of the processing load among the jobs.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
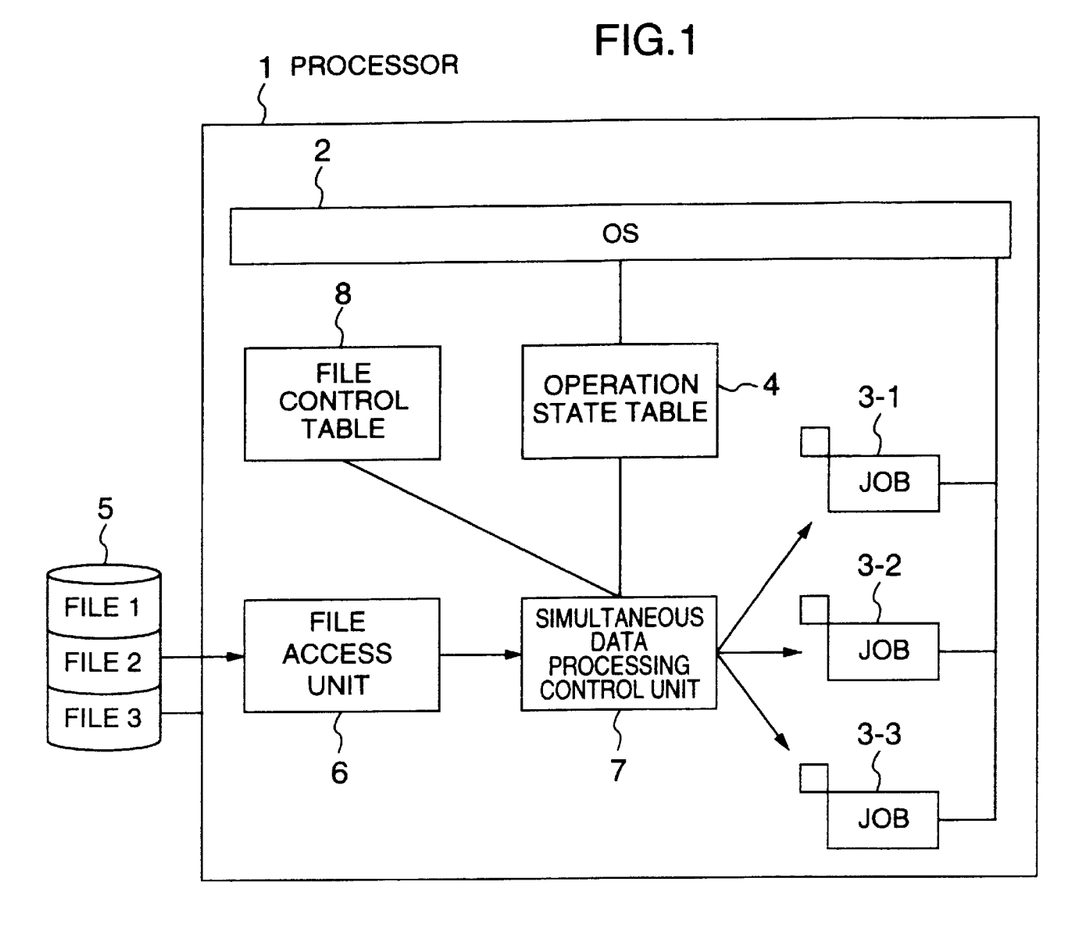
FIG. 1 is a block diagram showing the configuration of an embodiment of the data processing system according to the present invention.

FIG. 1 shows in a block diagram the construction of an embodiment of the data processing system according to the present invention. In FIG. 1, a reference numeral 1 indicates a processor to execute jobs and a numeral 5 denotes a disk device in which data to be processed by the processor 1 are stored. The processor 1 is connected to the disk device 5 via an input/output channel not shown. Moreover, stored in the disk device 5 are a plurality of files each including at least one record. In addition, it is assumed in the embodiment that data are sequentially stored in each file beginning at a first position thereof.

Furthermore, in the processor 1 of FIG. 1, there are arranged an operating system (OS) 2 to control operation of the processor 1, a plurality of jobs 3-i (i=1, 2, 3) to respectively accomplish data processing under control of the operation system 2, an operation state table 4 in which an operation state of each job 3-i is stored by the operating system 2, file access unit 6 to control input/output operations of files in the disk device 5, concurrent data processing control unit 7 to transfer data from the file to at least one of the jobs 3-i, and a file control table 8 indicating relationships between the files and the plural jobs 3-i to execute predetermined data processing for data stored in the files. In this connection, it is an aspect of this embodiment that data of the files are allocated to the jobs 3-i (i=1, 2, 3) in a shared manner, which will be described later. Moreover, the file access unit 6 and the parallel data processing control unit 7 are implemented by programs.

Figure 2:
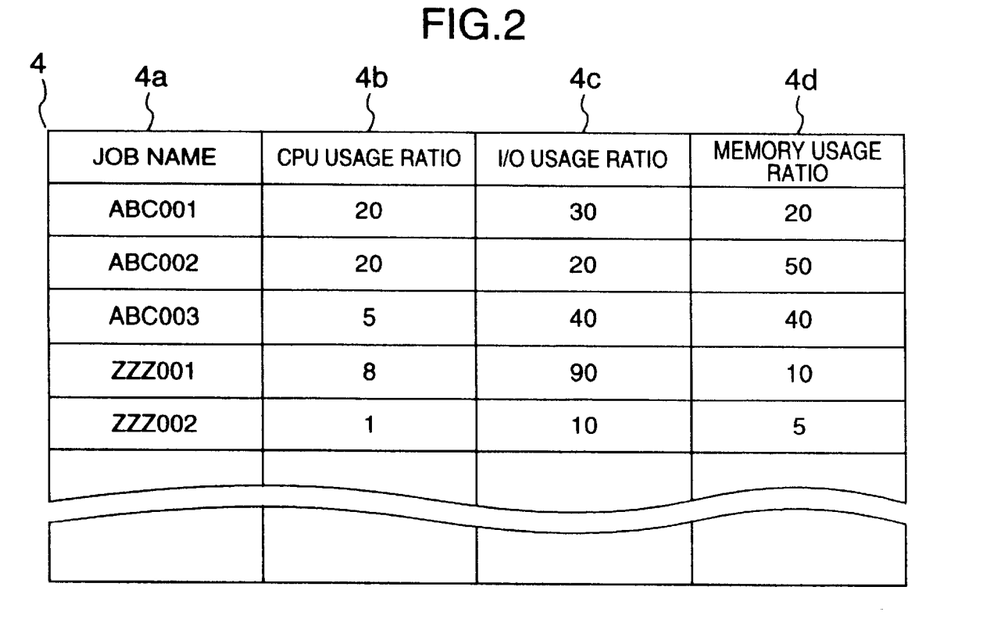
FIG. 2 is a block diagram showing the structure of an operation state table of the data processing system.

FIG. 2 shows the layout of the operation state table 4. Stored in the table 4 are a job name 4a to identify each job and a CPU usage ratio 4b, an input/output (I/O) usage ratio 4c, and a memory usage ratio 4d which indicate the operation state of the pertinent job. Each usage ratio is set to a value measured by the operating system 2 at a predetermined interval. The value is represented, for example, in percentage. For example, according to FIG. 2, in the execution of a job having a job name of ABC001, the CPU usage ratio is 20%, the I/O usage ratio (ratio in terms of time of accesses to the disk device 5) is 30%, and the memory usage ratio (ratio of the memory area for the execution of the job to the entire memory) is 20%.

Figure 3:
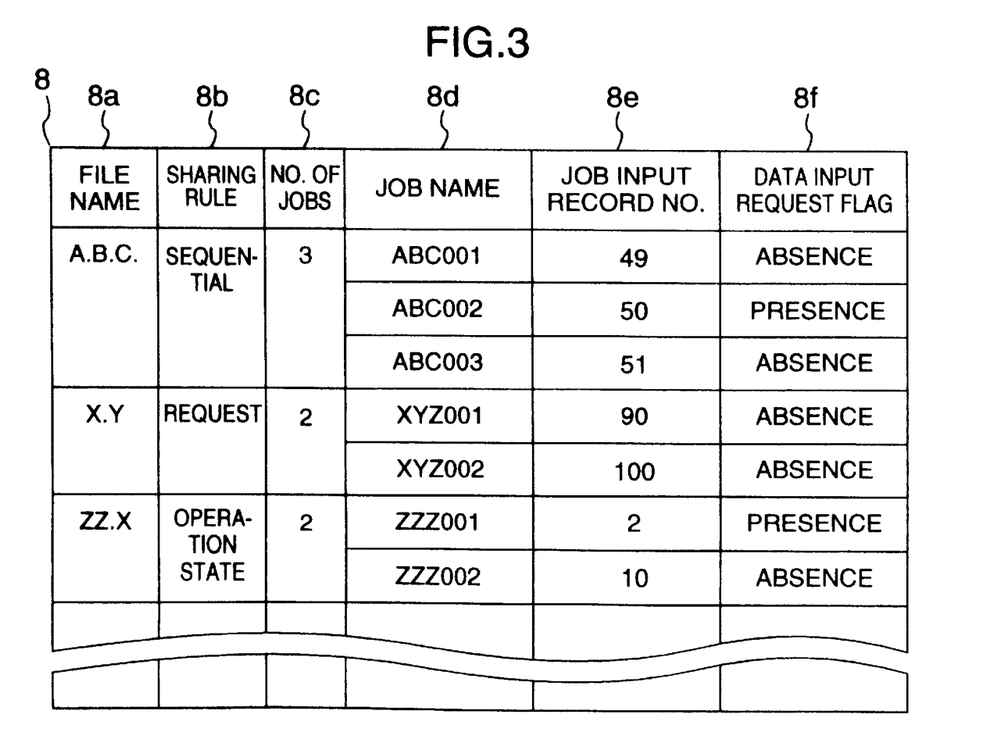
FIG. 3 is a block diagram showing the construction of a file control table of the data processing system.

FIG. 3 shows the file control table 8. The table 8 includes a file name 8a to identify each file, a sharing rule or partitioning rule 8b used when data of the pertinent file are distributively transferred to the plural jobs, a number of jobs 8c to conduct input operations for the file (to read data therefrom), a job name 8d to identify each job to simultaneously access the file, an input record number 8e to identify data previously inputted from the file by the job, and a data input request flag 8f to indicate presence or absence of a data input (read) request from the job. Assume that the plural jobs that access one file at the same time are called relational jobs. In FIG. 3, for example, there are three relational jobs respectively having job names ABC001, ABC002, and ABC003. These jobs simultaneously input data from a file having a file name of A.B.C. In the sharing rule field 8b, there is stored "order", "request", or "operation state". Each processing method of the job 3-i for the specification of these items will be described later.

Figure 4:
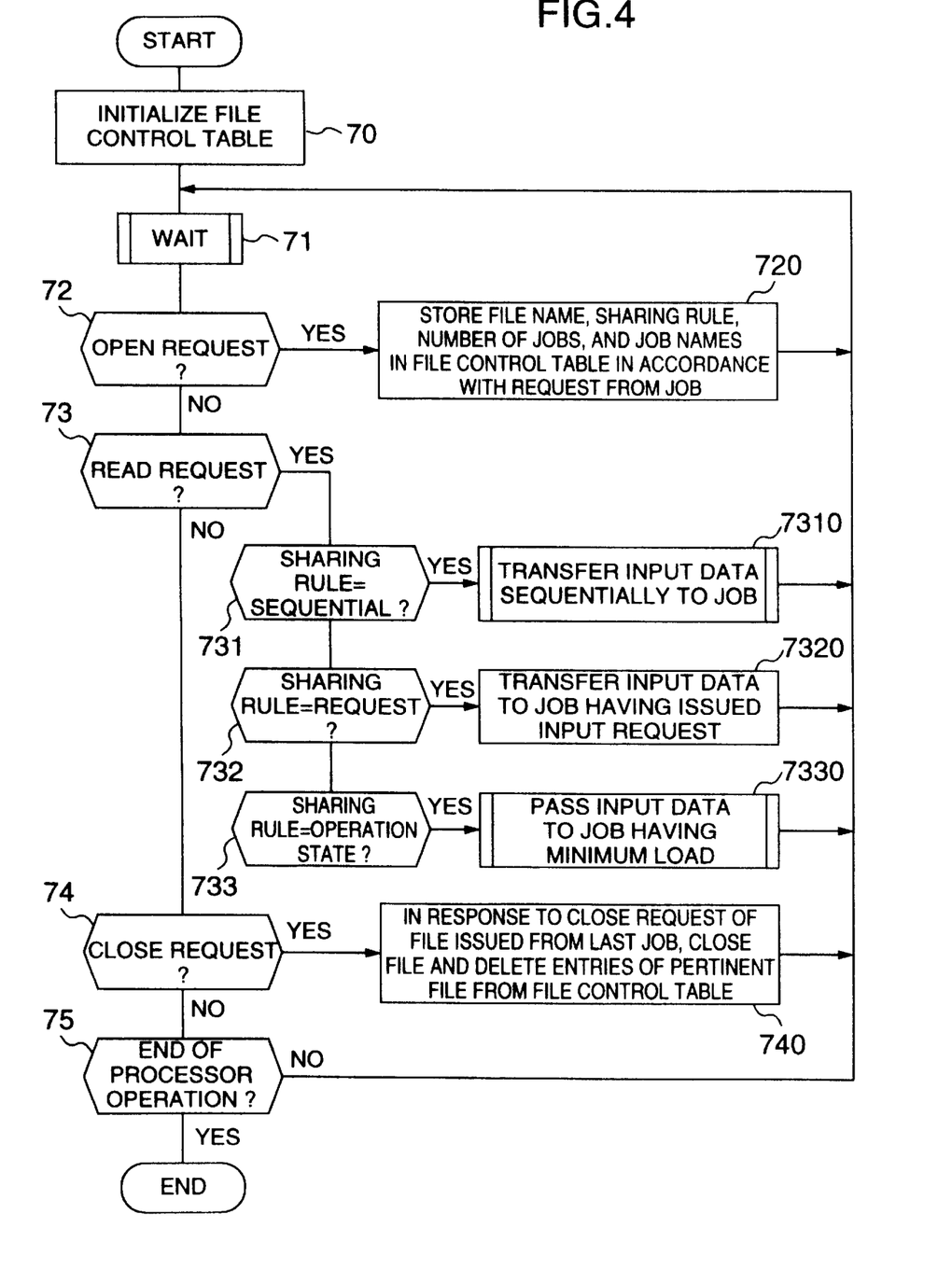
FIG. 4 is a flowchart showing the operation procedure of simultaneous data processing control means of FIG. 1.

FIG. 4 shows in flowchart the operation procedure of the concurrent data processing control unit 7. The program-implemented processing control unit 7 is initiated by the operating system 2 at the starting point of operation of the processor 1 (system setup) to initialize the control table 8 (to clear data items thereof to zero; step 70). The means 7 then enters a wait state to await requests from jobs 3-i and the operation system 2 (step 71). When the request from job 3-i is an OPEN request for a file in the disk device 5 (to set the file to an available state; YES in step 72), the program implemented processing control means 7 stores the file name 8a, the data sharing rule 8b, the number of jobs for data sharing 8c, and the job name 8d in the control table 8 according to information of the request specified by the job 3-i in a job control language (JCL). In addition, the unit 7 sets the input record number 8e to 0 and the data input request flag 8f to "absent" for the pertinent job (step 720). When there is received from the job 3-i an OPEN request with a file name 8a already registered to the control table 8, the unit 7 produces entries of the table 8 as follows. Namely, the unit 7 sets the distribution rule 8d and the number of jobs 8c to the beforehand registered values, the job name 8d to that of the job 3-j, the input record number 8e to 0, and the request flag 8f to "absence".

On the other hand, when the request from job 3-i is a READ request for an opened file (YES in step 73), the unit 7 refers to the file control table 8 to examine the data distribution rule 8 for the file name 8a of the file associated with the read request. When "sharing rule=sequential" is assumed as a result of the examination (YES in step 731), the control means 7 executes the processing of FIG. 5 (step 7310), which will be described later, to sequentially transfer the input data to the relational jobs. When "sharing rule=request" is recognized (YES in step 732), the control means 7 accesses the control table 8 to attain the maximum record number of the file in the disk device 5 and then sets "maximum record number+1" to the record number. The control means 7 reads data of one record from the file and thereafter sets the record number of the obtained record to the input record number 8e associated with the job 3-i in the file control table 8, and then passes the input data to the pertinent job 3-i (step 7320). As above, when sharing rule=request", data of one record is passed to the job which issued the read request. When "sharing rule=operation state" (YES in step 733), the control means 7 carries out the processing of FIG. 6 to transfer the input data to one of the plural jobs 3-i simultaneously accessing the file, the job being imposed on a lowest load (step 7330).

Furthermore, when the request from the job 3-i is a CLOSE request for a file (to terminate usage of the file; YES in step 74), the program-implemented control unit 7 closes the file only when a close request is already issued from all jobs 3-i and then deletes the entries related to the file from the file control table 8 (step 740).

Finally, when a termination of operation of the processor 1 is received from the operating system 2 (YES in step 75), the control unit 7 terminates operation of the processor 1. On the other hand, to continue operation of the processor 1 (NO in step 75), the control unit 7 returns control to the processing of step 71 and enters the wait state awaiting requests from the jobs 3-i and the operating system 2.

Figure 5:
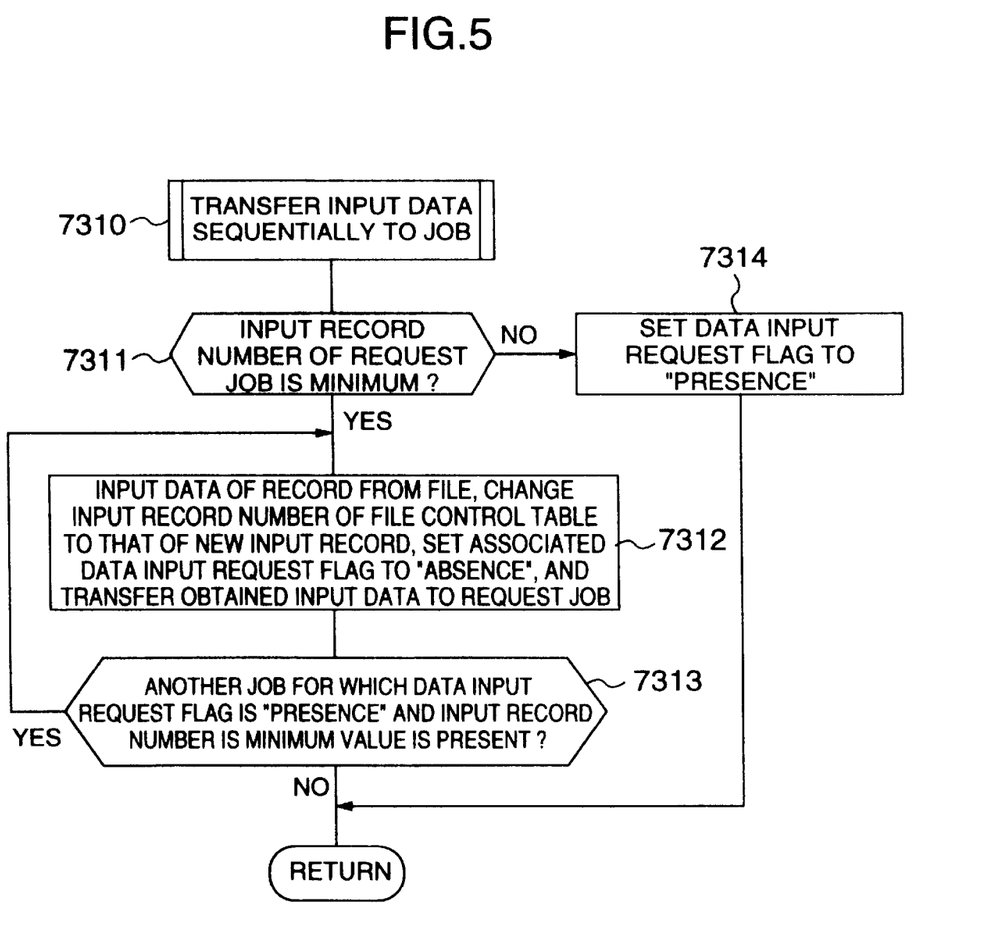
FIG. 5 is a flowchart showing a process to pass data to a job for "sharing rule=sequential" in FIG. 4.

FIG. 5 shows in a flowchart a process to transfer data to a job when "sharing rule=sequential" in FIG. 4. According to the sharing rule, data are transferred to job which has issued the first read request to the pertinent file. In step 7310 of FIG. 5 to sequentially pass the input data to the jobs 3-i which use the file, the value of input record number 8e as an entry of the control table 8 corresponding to the job name 8d to identify the job (to be referred to as "request job" herebelow) 3i having issued the read request is checked to determine whether or not the value is less than those respectively of the relational jobs 3-i which simultaneously input data from the file 5 (step 7311). If it is determined as a result of the check that the input record number 8e of the request job is minimum (YES in step 7311), data of a record having a record number represented by "maximum input record number 8e of the file+1" is read from the file and then the value of input record number 8e of the request job in the control table 8 is changed to the record number of the inputted record. In addition, the data input request flag 8f is set to "absence" and then the attained input data is passed to the request job (step 7312). Furthermore, a check is performed through the relational jobs 3i concurrently inputting data from the file to determine existence of a job for which the data input request flag 8f is "presence" and the value of the input record number 8e is minimum among those of the relational jobs 3*i* (step 7313). When such a job is present (YES in step 7313), step 7312 is again processed. Namely, the operation above is repeatedly executed for all of the jobs 3*i* satisfying the above conditions. On the other hand, when it is determined that the input record number 8*e* of the relational job 3*i* takes other than the minimum value (NO in step 7311), the input request flag 8*f* is set to "presence" for the request job 3*i* (step 7314).

Thanks to the above execution of processing, when the file read operation is carried out in the sequence of jobs 3-1, 3-2, and 3-3, the data of one record is passed to the jobs in this order.

Figure 6:
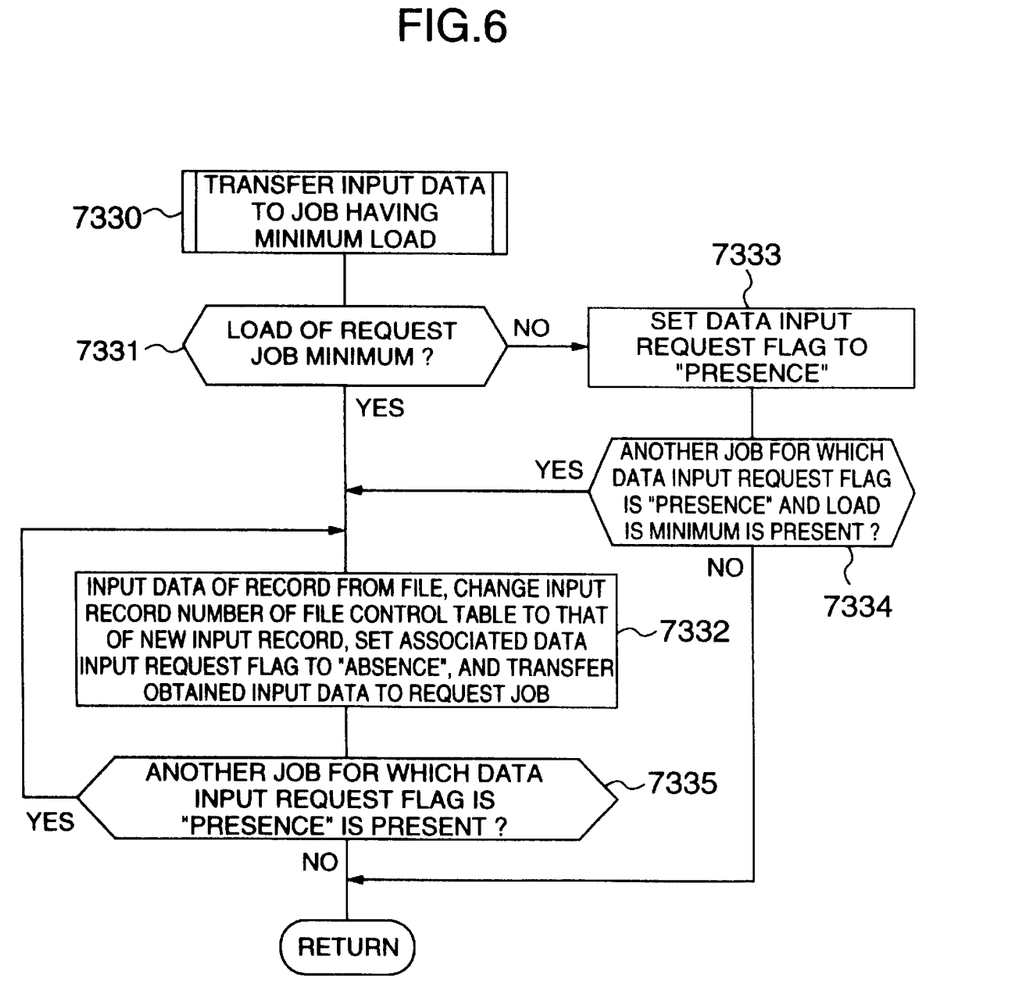
FIG. 6 is a flowchart showing a process to pass data to a job for "sharing rule=operation state" in FIG. 4.

FIG. 6 shows in flowchart the process to pass data to a job when "sharing rule=operation state" in FIG. 4. In step 7330 of FIG. 6 to transfer the input data to the least loaded one of the jobs 3-i accessing the same file, the operation state table 4 is first referenced to determine whether or not the load of the request job is minimum among those of the relational jobs 3-i simultaneously inputting data from the file (step 7331). When the request job is determined to take the minimum load value (YES in step 7331), data of one record having a record number equal to "maximum input record number 8*e* of the file+1" is inputted (or read) from the file on the disk 5. The value of input record number 8*e* of the request job stored in the control table 8 is changed to the record number of the inputted data, the associated data input request flag 8*f* is set to "absence", and then the input data thus acquired is transferred to the request job (step 7332). Additionally, a check is conducted to determine whether or not the relational jobs 3-i include a job for which the data input request flag 8*f* is "presence" (step 7335). When such a job exists (YES in step 7335), the process of step 7332 is again executed. Namely, the operation is repeatedly accomplished for all jobs 3*i* satisfying the condition above. On the other hand, when the load of the request job is determined to be other than the minimum value (NO in step 7331), the request flag 8*f* is set to "presence" for the request job (step 7333) and then a check is conducted to determine whether or not the relational jobs 3-i include a job for which the data input request flag 8*f* is "presence" and of which the load takes the minimum value (step 7334). When such a job is present (YES in step 7334), the process of step 7332 is again executed.

Figure 7:
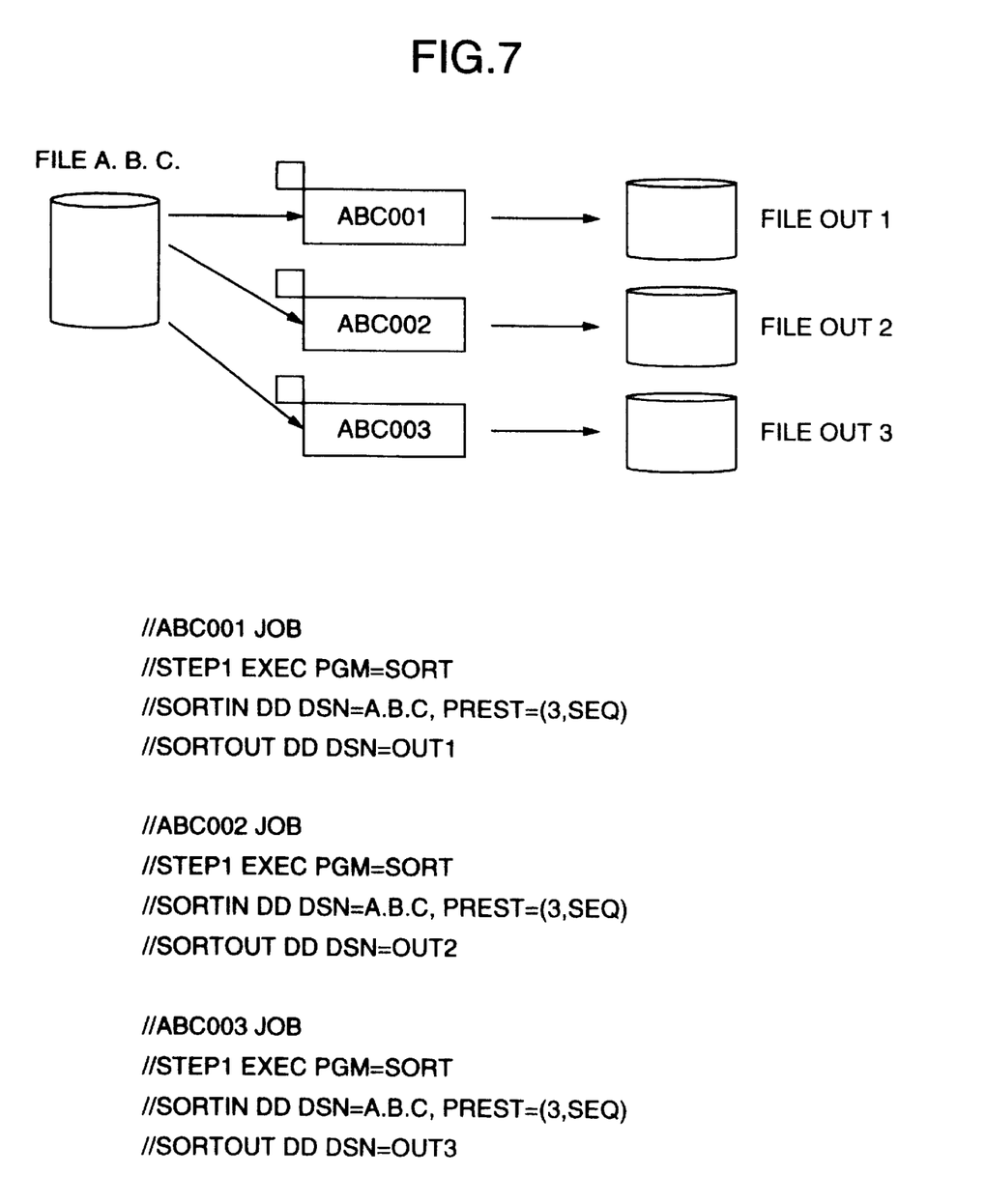
FIG. 7 is a flowchart of a distributive sorting process described in a job control language (JCL).

FIG. 7 diagramatically shows a specific utilization example of the present invention.

In the example of FIG. 7 written in JCL, the contents of file A.B.C are distributively sorted in a shared fashion by three jobs ABC001, ABC002, and ABC003.

In JCL of each job, DSN=A.B.C is specified in a DD statement of SORTIN defining an input file. This indicates that "file name=A.B.C" is specified. Moreover, PREST=(3, SEQ) is specified to denotes that "the present invention is used", "number of jobs=3", and "sharing rule=sequential".

In execution of these jobs, when program SORT opens the file, the concurrent data processing control means of the present invention stores "file name", "sharing rule", "number of jobs", and "job name" in the file control table 8 of FIG. 3. Thereafter, when SORT reads data from file A.B.C, the input data is sequentially passed to the jobs of FIG. 5 in accordance with the process step 7310.

When the jobs are completely executed, files OUT1, OUT2, and OUT3 resulted respectively from the jobs ABC001, ABC002, and ABC003 are merged with each other to complete the sorting of file A.B.C.

As above, in an operation to sort, for example, 30,000 data items, each job need only sort 10,000 data items and hence the sorting speed is increased. The effect of increase in the sorting speed is particularly remarkable in a multi-processor system in which an instruction processor is available for each job.

As described above, according to the present invention, a process of data of one file can be executed by a plurality of jobs in a shared manner without allocating the data of the file to a plurality of files respectively associated with the jobs. Furthermore, the data of one file can be processed while the load of data processing is shared to a plurality of jobs.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A method of reading data of one file by a plurality of jobs in a shared fashion, comprising:

a step of relating the plurality of lobs which read the file with each other;

a step of acquiring, in response to a read request issued from one of the related jobs to read data sequentially stored in the file beginning at a first position thereof, a minimum record number of a record of the file, which has not been read therefrom;

a step of passing contents of the record having the acquired minimum record number to the read-requesting job; and a step of, in response to a request of reading by the others of said related jobs, repeating said acquiring step and said reading step until reading of all of the records from said file is terminated.

2. A method of reading data of one file by a plurality of jobs in a shared fashion according to claim 1, further comprising:

a step of assigning sequential numbers respectively to said plurality of jobs;

a step of recording record numbers of last records which have been last read by the respective jobs from the file;

a first determining step of determining, in response to a read request issued from one of the jobs to read data which are sequentially stored in the file, whether or not the record number of the record of the file which has been last read by the read-requesting job is less than the record numbers of the records of the file last read respectively by the jobs having sequential numbers less than that of the read-requesting job wherein said step of acquiring is performed in response to an affirmative determination from said first determining step;

a second determining step of determining, in response to transfer of the contents of the file to one of the jobs, whether or not one of the lobs having a sequential number subsequent to that of the read-requesting job to which the contents of the file is passed issues a read request for the file; and a read step of passing, in response to an affirmative determination from said second determining step, the contents of a record of the file to the subsequent job, which record has a minimum number and has not been read therefrom.

3. A method of reading data of one file by a plurality of jobs in a shared fashion according to claim 2, wherein said sequential numbers are assigned in a sequence of read requests first issued respectively from the jobs.

4. A method of reading data of one file by a plurality of jobs in a shared fashion according to claim 3, further comprising:

a step of calculating a load of each of the jobs;

a third determining step of determining, in response to a read request issued from one of the jobs to read data sequentially stored in the file beginning at a first position of the file, whether or not the load of the read-requesting job is a minimum load among the loads respectively of the plurality of jobs wherein said step of acquiring is performed in response to an affirmative determination from said third determining step;

a fourth determining step of determining, in response to transfer of the contents of the file to one of the jobs, whether or not one of the jobs having the minimum load among the jobs other than the job having received the contents of the file issues a read request for the file; and a read step of passing, in response to an affirmative determination from said fourth determining step, the contents of a record of the file having a minimum number and having not been read therefrom to the job having the minimum load.

5. A method of reading data of one file by a plurality of jobs in a shared fashion according to claim 4, wherein said load is a load of each of the jobs associated with input/output operations, a central processing unit (CPU), or a memory.

* * * * *